(12) United States Patent
Weir et al.

(10) Patent No.: US 7,993,611 B2
(45) Date of Patent: Aug. 9, 2011

(54) METHOD OF PREPARING CERAMIC POWDERS USING AMMONIUM OXALATE

(75) Inventors: Richard D. Weir, Cedar Park, TX (US); Carl W. Nelson, Austin, TX (US)

(73) Assignee: EEStor, Inc., Cedar Park, TX (US)

( * ) Notice: Subject to any disclaimer, the term of this patent is extended or adjusted under 35 U.S.C. 154(b) by 578 days.

(21) Appl. No.: 11/497,744

(22) Filed: Aug. 2, 2006

(65) Prior Publication Data

US 2008/0031796 A1   Feb. 7, 2008

(51) Int. Cl.
*C22B 31/00* (2006.01)

(52) U.S. Cl. ......... 423/1; 423/352; 423/592.1; 423/598; 423/599; 423/594.16; 423/608; 423/356; 501/134; 501/135; 501/136; 501/137

(58) Field of Classification Search ............... 423/352, 423/592.1, 598, 599, 594.16, 608, 356; 501/134, 501/135, 136, 137

See application file for complete search history.

(56) References Cited

U.S. PATENT DOCUMENTS

| | | |
|---|---|---|
| 3,647,364 A | 3/1972 | Mazdiyasni et al. |
| 3,947,553 A | 3/1976 | Moss |
| 4,054,598 A | 10/1977 | Blum et al. |
| 4,606,906 A | 8/1986 | Ritter et al. |
| 4,643,984 A | 2/1987 | Abe et al. |
| 4,671,618 A | 6/1987 | Wu et al. |
| 4,733,328 A | 3/1988 | Blazej |
| 4,772,576 A | 9/1988 | Kimura et al. |
| 4,834,952 A | 5/1989 | Rollat |
| 4,839,339 A * | 6/1989 | Bunker et al. ............... 505/510 |
| 4,859,448 A | 8/1989 | Klee et al. |
| 4,880,758 A | 11/1989 | Heistand, II et al. |
| 4,886,654 A | 12/1989 | Ohga et al. |
| 4,946,810 A | 8/1990 | Heistand, II et al. |
| 5,011,804 A | 4/1991 | Bergna et al. |
| 5,017,446 A | 5/1991 | Reichman et al. |
| 5,043,843 A | 8/1991 | Kimura et al. |
| 5,045,170 A | 9/1991 | Bullock et al. |
| 5,064,783 A | 11/1991 | Luckevich |
| 5,073,843 A | 12/1991 | Magee |
| 5,082,811 A * | 1/1992 | Bruno ......................... 501/134 |
| 5,086,021 A | 2/1992 | Sasaki et al. |
| 5,087,437 A | 2/1992 | Bruno et al. |

(Continued)

FOREIGN PATENT DOCUMENTS

EP   0250085 A2   12/1987

(Continued)

OTHER PUBLICATIONS

Beheir et al., "Studies on the liquid-liquid extraction and ion and precipitate flotation of Co(II) with decanoic acid," Journal of Radioanalytical and Nuclear Chemistry, Articles, vol. 174, No. 1 (1992) 13-22.

(Continued)

*Primary Examiner* — Jun Li (57) ABSTRACT

Wet-chemical methods involving the use of water-soluble hydrolytically stable metal-ion chelate precursors and an ammonium oxalate precipitant can be used in a coprecipitation procedure for the preparation of ceramic powders. Both the precursor solution and the ammonium oxalate precipitant solution are at neutral or near-neutral pH. A composition-modified barium titanate is one of the ceramic powders that can be produced. Certain metal-ion chelates can be prepared from 2-hydroxypropanoic acid and ammonium hydroxide.

24 Claims, 1 Drawing Sheet

U.S. PATENT DOCUMENTS

| | | | |
|---|---|---|---|
| 5,116,560 A * | 5/1992 | Dole et al. | 264/1.22 |
| 5,116,790 A * | 5/1992 | Bruno et al. | 501/139 |
| 5,118,528 A | 6/1992 | Fessi et al. | |
| 5,155,072 A | 10/1992 | Bruno et al. | |
| 5,196,388 A | 3/1993 | Shyu | |
| 5,238,673 A | 8/1993 | Bruno et al. | |
| 5,242,674 A | 9/1993 | Bruno et al. | |
| 5,252,311 A * | 10/1993 | Riman et al. | 423/619 |
| 5,340,510 A | 8/1994 | Bowen | |
| 5,362,472 A * | 11/1994 | Lauter et al. | 423/598 |
| 5,407,618 A * | 4/1995 | Stephenson | 264/623 |
| 5,417,956 A | 5/1995 | Moser | |
| 5,445,806 A | 8/1995 | Kinugasa et al. | |
| 5,466,646 A | 11/1995 | Moser | |
| 5,514,822 A | 5/1996 | Scott et al. | |
| 5,559,260 A | 9/1996 | Scott et al. | |
| 5,654,456 A | 8/1997 | Scott et al. | |
| 5,708,302 A | 1/1998 | Azuma et al. | |
| 5,711,988 A | 1/1998 | Tsai et al. | |
| 5,730,874 A | 3/1998 | Wai et al. | |
| 5,731,948 A | 3/1998 | Yializis et al. | |
| 5,738,919 A | 4/1998 | Thomas et al. | |
| 5,744,258 A | 4/1998 | Bai et al. | |
| 5,776,239 A | 7/1998 | Bruno | |
| 5,777,038 A | 7/1998 | Nishikawa et al. | |
| 5,797,971 A | 8/1998 | Zheng et al. | |
| 5,800,857 A | 9/1998 | Ahmad et al. | |
| 5,833,905 A | 11/1998 | Miki | |
| 5,850,113 A | 12/1998 | Weimer et al. | |
| 5,867,363 A | 2/1999 | Tsai et al. | |
| 5,900,223 A * | 5/1999 | Matijevic et al. | 423/263 |
| 5,929,259 A * | 7/1999 | Lockemeyer | 549/534 |
| 5,973,175 A * | 10/1999 | Bruno | 556/56 |
| 5,973,913 A | 10/1999 | McEwen et al. | |
| 5,995,359 A | 11/1999 | Klee et al. | |
| 6,005,764 A | 12/1999 | Anderson et al. | |
| 6,072,688 A | 6/2000 | Hennings et al. | |
| 6,078,494 A | 6/2000 | Hansen | |
| 6,106,797 A | 8/2000 | Muller et al. | |
| 6,159,442 A | 12/2000 | Thumm et al. | |
| 6,171,571 B1 | 1/2001 | Bedard et al. | |
| 6,195,249 B1 | 2/2001 | Honda et al. | |
| 6,221,332 B1 | 4/2001 | Thumm et al. | |
| 6,228,161 B1 * | 5/2001 | Drummond | 106/464 |
| 6,243,254 B1 | 6/2001 | Wada et al. | |
| 6,268,054 B1 | 7/2001 | Costantino et al. | |
| 6,282,079 B1 | 8/2001 | Nagakari et al. | |
| 6,294,620 B1 | 9/2001 | Huang et al. | |
| 6,296,716 B1 * | 10/2001 | Haerle et al. | 134/7 |
| 6,331,929 B1 | 12/2001 | Masuda | |
| 6,352,681 B1 | 3/2002 | Horikawa et al. | |
| 6,410,157 B1 | 6/2002 | Nakamura | |
| 6,420,476 B1 | 7/2002 | Yamada et al. | |
| 6,432,526 B1 | 8/2002 | Arney et al. | |
| 6,447,910 B1 | 9/2002 | Wataya | |
| 6,485,591 B1 | 11/2002 | Nakao | |
| 6,501,639 B2 | 12/2002 | Takafuji | |
| 6,550,117 B1 | 4/2003 | Tokuoka | |
| 6,589,501 B2 | 7/2003 | Moser et al. | |
| 6,599,463 B2 | 7/2003 | Miyazaki et al. | |
| 6,627,099 B2 | 9/2003 | Ono et al. | |
| 6,673,274 B2 | 1/2004 | Venigalla et al. | |
| 6,692,721 B2 | 2/2004 | Hur et al. | |
| 6,703,719 B1 | 3/2004 | McConnell | |
| 6,715,197 B2 | 4/2004 | Okuyama | |
| 6,749,898 B2 | 6/2004 | Nakamura | |
| 6,790,875 B2 | 9/2004 | Noguchi et al. | |
| 6,790,907 B2 | 9/2004 | Takata et al. | |
| 6,819,540 B2 | 11/2004 | Allen et al. | |
| 6,869,586 B1 | 3/2005 | Moser et al. | |
| 6,905,989 B2 | 6/2005 | Ellis et al. | |
| 7,033,406 B2 | 4/2006 | Weir et al. | |
| 7,061,139 B2 | 6/2006 | Young | |
| 7,068,898 B2 | 6/2006 | Buretea et al. | |
| 7,091,344 B2 | 8/2006 | Hall et al. | |
| 7,147,834 B2 | 12/2006 | Wong et al. | |
| 7,164,197 B2 | 1/2007 | Mao et al. | |
| 7,182,930 B2 | 2/2007 | Tsay et al. | |
| 7,190,016 B2 | 3/2007 | Cahalen et al. | |
| 7,223,378 B2 | 5/2007 | Sterzel | |
| 7,228,050 B1 | 6/2007 | Buretea et al. | |
| 7,247,590 B2 | 7/2007 | Kawabata et al. | |
| 7,431,911 B2 | 10/2008 | Shirakawa et al. | |
| 7,496,318 B2 | 2/2009 | Miura et al. | |
| 7,595,109 B2 | 9/2009 | Weir et al. | |
| 7,729,811 B1 | 6/2010 | Weir et al. | |
| 7,757,631 B2 | 7/2010 | Devos et al. | |
| 7,881,039 B2 | 2/2011 | Lee et al. | |
| 2001/0010367 A1 | 8/2001 | Burnell-Jones | |
| 2002/0186522 A1 | 12/2002 | Honda et al. | |
| 2003/0052658 A1 | 3/2003 | Baretich | |
| 2003/0215384 A1 | 11/2003 | Sterzel et al. | |
| 2004/0071944 A1 | 4/2004 | Weir et al. | |
| 2004/0135436 A1 | 7/2004 | Gilbreth | |
| 2004/0163570 A1 | 8/2004 | Vanmaele et al. | |
| 2004/0175585 A1 | 9/2004 | Zou et al. | |
| 2005/0167404 A1 | 8/2005 | Yamazaki | |
| 2006/0022304 A1 | 2/2006 | Rzeznik | |
| 2006/0045840 A1 | 3/2006 | Chen et al. | |
| 2006/0078492 A1 | 4/2006 | Kurozumi et al. | |
| 2006/0133988 A1 | 6/2006 | Kurozumi et al. | |
| 2006/0159850 A1 | 7/2006 | Breton et al. | |
| 2006/0172880 A1 | 8/2006 | Shirakawa et al. | |
| 2006/0182667 A1 | 8/2006 | Zech et al. | |
| 2006/0210779 A1 | 9/2006 | Weir et al. | |
| 2006/0269762 A1 | 11/2006 | Pulugurtha et al. | |
| 2006/0283354 A1 | 12/2006 | Shinoda et al. | |
| 2007/0026580 A1 | 2/2007 | Fujii | |
| 2007/0040204 A1 | 2/2007 | Pulugurtha et al. | |
| 2007/0085212 A1 | 4/2007 | Mao et al. | |
| 2007/0103421 A1 | 5/2007 | Sekine et al. | |
| 2007/0141747 A1 | 6/2007 | Li et al. | |
| 2007/0148065 A1 | 6/2007 | Weir et al. | |
| 2007/0199729 A1 | 8/2007 | Siegel et al. | |
| 2007/0202036 A1 | 8/2007 | Jongen et al. | |
| 2007/0205389 A1 | 9/2007 | Kurozumi et al. | |
| 2007/0253145 A1 | 11/2007 | Kurozumi et al. | |
| 2008/0016681 A1 | 1/2008 | Eisenring | |
| 2008/0026929 A1 | 1/2008 | Jensen et al. | |
| 2008/0031796 A1 | 2/2008 | Weir et al. | |
| 2008/0044344 A1 | 2/2008 | Shikida et al. | |
| 2008/0090006 A1 | 4/2008 | Yoshinaka et al. | |
| 2008/0145292 A1 | 6/2008 | Shirakawa et al. | |
| 2008/0241042 A1 | 10/2008 | Li et al. | |
| 2008/0280161 A1 | 11/2008 | Jang et al. | |
| 2008/0318144 A1 | 12/2008 | Watanabe et al. | |
| 2009/0001317 A1 | 1/2009 | Okamoto | |
| 2009/0001353 A1 | 1/2009 | Shukla et al. | |
| 2009/0002802 A1 | 1/2009 | Shibuya et al. | |
| 2009/0050850 A1 | 2/2009 | Fukui et al. | |
| 2009/0326729 A1 | 12/2009 | Hakim et al. | |

FOREIGN PATENT DOCUMENTS

| | | | |
|---|---|---|---|
| EP | 0439620 A1 | | 8/1991 |
| EP | 0206575 B1 | | 2/1993 |
| EP | 1020487 A1 | | 7/2000 |
| EP | 1148030 A1 | | 10/2001 |
| EP | 1296339 A1 | | 10/2001 |
| EP | 1500721 A1 | | 1/2005 |
| EP | 1598326 A1 | | 11/2005 |
| EP | 1626065 A1 | | 2/2006 |
| EP | 1724015 A1 | | 11/2006 |
| EP | 1788040 A1 | | 5/2007 |
| EP | 1860068 A1 | | 11/2007 |
| JP | 55154321 | | 12/1980 |
| JP | 61-103533 A | | 5/1986 |
| JP | 63248719 | * | 4/1987 |
| JP | S63-248719 A | | 10/1988 |
| JP | 01179721 | * | 7/1989 |
| JP | 03068102 A | | 3/1991 |
| JP | 403068102 A | | 3/1991 |
| JP | 05017150 A | * | 1/1993 |
| JP | 07291607 A | * | 11/1995 |
| JP | 10092685 A | | 4/1998 |
| JP | 11102834 A | | 4/1999 |
| JP | 11147716 | | 6/1999 |
| JP | 2001110665 A | | 4/2001 |

| | | | |
|---|---|---|---|
| JP | 2003192343 | | 7/2003 |
| JP | 2005109176 | A | 4/2005 |
| KR | 10-0596602 | B1 | 7/2006 |
| KR | 100773895 | B1 | 11/2007 |
| WO | 9108469 | A2 | 6/1991 |
| WO | 9316012 | | 8/1993 |
| WO | 2004092070 | A1 | 10/2004 |
| WO | 2005097704 | A1 | 10/2005 |
| WO | 2005097705 | A1 | 10/2005 |
| WO | 2006022447 | A1 | 3/2006 |
| WO | 2006124670 | A2 | 11/2006 |
| WO | 2007103421 | A2 | 9/2007 |
| WO | 2008153585 | A1 | 12/2008 |
| WO | 2008155970 | A1 | 12/2008 |

OTHER PUBLICATIONS

Bruno et al., "High-Performance Multilayer Capacitor Dielectrics from Chemically Prepared Powders", Journal of the American Ceramic Society, vol. 76, No. 5. pp. 1233-1241, 1993.

J. Kuwata et al., "Electrical Properties of Perovskite-Type Oxide Thin-Films Prepared by RF Sputtering", JPN J. Appl. Phys., Part 1, 1985, 413-415.

F. Sears et al., "Capacitance—Properties of Dielectrics", University of Physics, Addison Wesley Publishing Company, Inc., Feb. 1984, pp. 516-533.

Mitsubishi Polyester Film Corporation specification sheet for Hostaphan (R) RE film for capacitors,Copyright 2007.

U.S. Appl. No. 11/499,594.
U.S. Appl. No. 10/917,144.
U.S. Appl. No. 11/453,581.
Carter, C. Barry et al., "Ceramic Materials Science and Engineering", 2007, Springer+Business Media, LLC; 4 pages.
MSDS: Material Safety Data Sheet, "Ammonium Oxalate", 11 pages.
Non-Final Office Action dated Nov. 28, 2008 from U.S. Appl. No. 11/369,255, filed Mar. 7, 2006, Inventor(s): Richard D. Weir, et al.
Supplemental Non-Final Office Action dated Dec. 11, 2008 from U.S. Appl. No. 11/369,255, filed Mar. 7, 2006, Inventor(s): Richard D. Weir, et al.
Final Office Action dated Apr. 1, 2009 from U.S. Appl. No. 11/369,255, filed Mar. 7, 2006, Inventor(s): Richard D. Weir, et al.
Non-Final Office Action dated Aug. 6, 2009 from U.S. Appl. No. 11/369,255, filed Mar. 7, 2006, Inventor(s): Richard D. Weir, et al.
Final Office Action dated Feb. 2, 2010 from U.S. Appl. No. 11/369,255, filed Mar. 7, 2006, Inventor(s): Richard D. Weir, et al.
Non-Final Office Action dated May 20, 2010 from U.S. Appl. No. 11/369,255, filed Mar. 7, 2006, Inventor(s): Richard D. Weir, et al.
Beheir, Sh. G.; "Studies on the Liquid-Liquid Extraction and Ion and Precipitate Flotation of Co(II) with Decanoic Acid", Journal of Radioanalytical and Nuclear Chemistry, Articles, vol. 174, No. 1, (1993), pp. 13-22.
US 7,041,269, 05/2006, Shirakawa et al. (withdrawn)

* cited by examiner

METHOD OF PREPARING CERAMIC POWDERS USING AMMONIUM OXALATE

FIELD OF THE INVENTION

The present invention relates to methods for preparing ceramic powders, and particularly to wet-chemical processes using ammonium oxalate as a precipitant.

BACKGROUND OF THE INVENTION

Ceramic powders are used in the fabrication of numerous different types of devices including specialized mechanical components, coating for mechanical components, semiconductor devices, superconducting devices, device packaging, passive electronic components such as capacitors, and more sophisticated energy storage devices. Numerous different techniques exist for the synthesis and fabrication of ceramic powders including solid phase synthesis such as solid-solid diffusion, liquid phase synthesis such as precipitation and co-precipitation, and synthesis using gas phase reactants. Moreover, a host of related fabrication techniques can also be used including: spray drying, spray roasting, metal organic decomposition, freeze drying, sol-gel synthesis, melt solidification, and the like.

Various advantages of wet-chemical methods used in the preparation of powders for the fabrication of ceramics have been well-known since the early 1950s. Pioneering work in this area has been done at the Massachusetts Institute of Technology, the National Bureau of Standards (now the National Institute of Standards and Technology), Philips Research Laboratories, and Motorola, Inc.

Despite the advantages of wet chemical processes, the ceramics industry largely remains reluctant to employ these techniques. Conventional methods for preparing ceramic powders entail mechanical mixing of dry powders of water-insoluble carbonates, oxides, and sometimes silicates, where each constituent of the ceramic composition is carefully selected individually. For example, if the ceramic composition has nine constituents in solid solution, then correspondingly nine starting powders are selected in accordance with the amount of each required for the end product compound. The starting powders are very likely to have different median particle sizes and different particle size distributions. In an attempt to comminute the mixture of powders to a smaller, more uniform particle size and size distribution for each component, the powder mixture is placed in a ball mill and milled for several hours. The milling process generates wear debris from the ball mill itself and, the debris becomes incorporated in the powder mixture. Because of the often wide disparity in particle size among the various commercially available starting powders (and even significant variation in particle size of the same powder from lot to lot), an optimum result from ball milling rarely occurs, and a contamination-free product is never obtained.

Moreover, additional processing steps are still required. Solid-solid diffusion at high temperature (but below the temperature at which sintering starts) of the ball-milled powder mixture is required to form a usable and, preferably, fully reacted homogeneous single powder. The finer each powder in the mixture is, the higher the particle surface-to-volume ratio is for each. This means that there is a greater surface area per unit weight of each powder for the solid-solid diffusion to occur. Moreover, longer times spent at high temperature (e.g., the calcining temperature) produce a more satisfactory end product. Homogeneity is improved by repeating several times the ball-milling and calcining steps in succession, each requiring several hours. Of course, this increases the amount of ball-milling wear debris added to the powder, thereby increasing the amount of contamination in the end ceramic product.

Accordingly, it is desirable to have improved wet-chemical processing techniques to prepare ceramic powders for use in the fabrication of various different devices and materials.

SUMMARY OF THE INVENTION

It has been discovered that wet-chemical methods involving the use of water-soluble hydrolytically stable metal-ion chelate precursors and an ammonium oxalate precipitant can be used in a co-precipitation procedure for the preparation of ceramic powders. Both the precursor solution and the ammonium oxalate precipitant solution are at neutral or near-neutral pH. A composition-modified barium titanate is one of the ceramic powders that can be produced. Certain metal-ion chelates can be prepared from 2-hydroxypropanoic acid and ammonium hydroxide.

In one embodiment in accordance with the invention a method is disclosed. A plurality of precursor materials in solution is provided. Each of the plurality of precursor materials in solution further comprises at least one constituent ionic species of a ceramic powder. The plurality of precursor materials in solution is combined with an ammonium oxalate precipitant solution to cause co-precipitation of the ceramic powder in a combined solution. The ceramic powder is separated from the combined solution.

In another embodiment in accordance with the invention, a substantially contaminant-free ceramic powder produced by a process is disclosed. The process comprises: providing a plurality of precursor materials in solution, wherein each of the plurality of precursor materials in solution further comprises at least one constituent ionic species of the ceramic powder, and wherein at least one of the plurality of precursor materials in solution is a chelate solution; combining the plurality of precursor materials in solution with an ammonium oxalate precipitant solution to cause co-precipitation of the ceramic powder in a combined solution; and separating the ceramic powder from the combined solution.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

The processes and techniques described in the present application can be utilized to prepare numerous different types of ceramic powders, as will be understood to those skilled in the art. Thus, although the present application emphasizes the use of these processes and techniques in the fabrication of dielectric materials for use in electrical energy storage devices (e.g., doped or composition-modified barium titanate), the same or similar techniques and processes can be used to prepare other ceramic powders, and those ceramic powders may find application in the manufacture of various components, devices, materials, etc.

High-permittivity calcined composition-modified barium titanate powders can be used to fabricate high-quality dielectric devices. U.S. Pat. No. 6,078,494 (hereby incorporated by reference herein in its entirety) describes examples of various doped barium titanate dielectric ceramic compositions. More specifically, the '494 patent describes a dielectric ceramic composition comprising a doped barium-calcium-zirconium-titanate of the composition $(Ba_{1-\alpha-\mu-\nu}A_\mu D_\nu Ca_\alpha)$ $[Ti_{1-x-\delta-\mu'-\nu'}Mn_\delta A'_{\mu'}D'_{\nu'}Zr_x]_zO_3$, where A=Ag, A'=Dy, Er, Ho, Y, Yb, or Ga; D=Nd Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, and $0.995 \leq z \leq 0$ $\leq \alpha \leq 0.005$. These barium-calcium-zirconium-titanate compounds have a perovskite structure of the general composition $ABO_3$, where the rare earth metal ions Nd, Pr, Sm and Gd (having a large ion radius) are arranged at A-sites, and the rare earth metal ions Dy, Er, Ho, Yb, the Group IIIB ion Y, and the Group IIIA ion Ga (having a small ion radius) are arranged at B-sites. The perovskite material includes the acceptor ions Ag, Dy, Er, Ho, Y or Yb and the donor ions Nb, Mo, Nd, Pr, Sm and Gd at lattice sites having a different local symmetry. Donors and acceptors form donor-acceptor complexes within the lattice structure of the barium-calcium-zirconium-titanate according to the invention. The dielectric ceramic compositions described by the '494 patent are just some of the many types of ceramic compositions that can be fabricated using the processes and techniques of the present application.

In the present application, chelates are used as precursors to one or more of the constituent components of a target ceramic powder. In general, chelation is the formation or presence of bonds (or other attractive interactions) between two or more separate binding sites within the same ligand and a single central atom. A molecular entity in which there is chelation (and the corresponding chemical species) is called a chelate. The terms bidentate (or didentate), tridentate, tetradentate . . . multidentate are often used to indicate the number of potential binding sites of the ligand, at least two of which are used by the ligand in forming a chelate.

For example, various wet-chemical powder preparation techniques for composition-modified barium titanate are described below. The methods make use of aqueous solutions for some or all reactants to form by co-precipitation the desired powders. Furthermore, the approach extends the use of one or more chelates (preferably water-soluble or water stable) as precursors to several of the component metal ions comprising the constituents of the composition-modified barium titanate. Ammonium oxalate (also known as diammonium ethanedioate) in aqueous solution is used as the precipitant for the mixture of precursors in aqueous solution.

The solubility of ammonium oxalate, stated as $(NH_4)_2C_2O_4$ with formula weight (FW) of 124.096, as the number of grams which when dissolved in 100 g of water make saturated solution at the temperature (° C.) stated, and the weight percent and molal concentrations determined therefrom, are shown in Table 1.

TABLE 1

| Temp. (° C.) | g/100 g H₂O | Wt % | Molal |
|---|---|---|---|
| 0 | 2.21 | 2.1622 | 0.1781 |
| 10 | 3.21 | 3.1102 | 0.2587 |
| 20 | 4.45 | 4.2604 | 0.3586 |
| 30 | 6.09 | 5.7404 | 0.4907 |
| 40 | 8.18 | 7.5615 | 0.6592 |
| 50 | 10.15 | 9.2147 | 0.8179 |
| 60 | 14.0 | 12.2807 | 1.1282 |
| 80 | 22.4 | 18.3007 | 1.8051 |
| 90 | 27.9 | 21.8139 | 2.2483 |
| 100 | 34.7 | 25.7610 | 2.7962 |

The volume amount of solution required for an application is best determined from the molar concentration, but the specific gravity at 20° C. in addition to the molal concentration has to be known. Since the oxalate anion is doubly negatively charged and the hydroxide anion (e.g., a tetraalkylammonium hydroxide) is singly negatively charged, as precipitants for a given molar concentration, half as many oxalate anions compared to hydroxide anions are required for the precipitation reaction with the metal-ion cations. The ammonium oxalate in aqueous solution is at neutral or near neutral pH (e.g., 6-8 pH), yielding certain advantages described below.

A suitable temperature range for the formation of aqueous-solution oxalate precipitated powders is 85° C. to 90° C. Above 90° C., slow decomposition begins to occur, increasing with increasing temperature. Below 85° C., the degree of crystallinity decreases significantly.

For the case of tetramethylammonium hydroxide $[(CH_3)_4NOH]$ being selected from among the tetraalkylammonium hydroxides, the most concentrated form commercially available is the 25 weight percent aqueous solution with a specific gravity at 20° C. of 1.016, corresponding to 3.6570 molal and 2.7866 molar concentrations. At 80° C., the solubility of ammonium oxalate is 1.8051 molal, and since half as many oxalate anions compared to hydroxide anions are required for the precipitation reaction with the metal-ion cations, the solution volumes are essentially equivalent. Thus, no change is required in the process reaction tube and vessels when one precipitant is substituted for the other.

In wet-chemical methods for the preparation of ceramic powders by co-precipitation of a mixture of precursors from solution, small amounts of precipitant and water will typically be included within the micropores and nanopores of the product powder. Similarly, small amounts of precipitant and water will also be adsorbed onto the surface of product powder. During calcination in air of the product powder, half of the oxygen of the oxalate anion in its thermal decomposition becomes part of a mixed oxide compound and the other half with all the carbon is converted by oxidation to carbon dioxide gas, and solution residuals such as: ammonium oxalate $[(NH_4)_2C_2O_4]$ (any excess amount), ammonium nitrate $(NH_4NO_3)$, ammonium 2-hydroxypropanate $[CH_3CH(OH)COONH_4]$, and triammonium 2-hydroxy-1,2,3-propanetricarboxylate $[(OH)C(COONH_4)(CH_2COONH_4)_2]$. These residuals are thermally decomposed and oxidized and thereby completely converted to gaseous products such as $H_2O$, $NH_3$, CO, $CO_2$, $N_2$, $N_2O$, NO, and $NO_2$. The same decomposition generally applies to any 2-hydroxycarboxylic acid that may be selected as a chelating agent, as described below.

In principle, no washing of the precipitated powder is needed to remove residual precipitant because the ammonium oxalate residuals, and other residuals, are completely volatilized away. However, in some embodiments, a deionized (DI) water washing step, or some other washing step, is performed. Thus, by the nonmetal-ion-containing ammonium oxalate an aqueous solution of water-soluble hydrated and chelated metal-ion species in their proportioned amounts is precipitated as an oxalate and by calcination in air converted to the oxide (the composition-modified barium titanate).

Ammonium oxalate monohydrate $(NH_4)_2C_2O_4 \cdot H_2O$ is a readily available commodity chemical which can be used as the source for the ammonium oxalate precipitant. Ammonium oxalate monohydrate is typically made by the reaction of oxalic acid and ammonium hydroxide in aqueous solution. At pH 7, there is generally no unreacted oxalic acid and ammonium hydroxide. While the ammonium oxalate is typically used at pH 7, it is often provided by manufacturers in the pH 6.0 to 7.0 range.

Preparation of the high-permittivity calcined composition-modified barium titanate powder in this manner yields high-purity powders with narrow particle-size distribution. The microstructures of ceramics formed from these calcined wet-chemical-prepared powders are uniform in grain size and can also result in smaller grain size. Electrical properties are improved so that higher relative permittivities and increased dielectric breakdown strengths can be obtained. Further improvement can be obtained by the elimination of voids within the sintered ceramic body with subsequent hot isostatic pressing.

In one embodiment, at least one, but not necessarily all of the precursors are chelates. A solution of the precursors: $Ba(NO_3)_2$, $Ca(NO_3)_2 \cdot 4H_2O$, $Nd(NO_3)_3 \cdot 6H_2O$, $Y(NO_3)_3 \cdot 4H_2O$, $Mn(CH_3COO)_2 \cdot 4H_2O$, $ZrO(NO_3)_2$, and $[CH_3CH(O-)COONH_4]_2Ti(OH)_2$, is formed in deionized water. In this example the Ti chelate $[CH_3CH(O-)COONH_4]_2Ti(OH)_2$ is used. As needed, the solution can be mixed and/or heated (e.g., heated to 80° C.) and is made in the proportionate amount in weight percent for each of the precursors as shown in Table 2.

TABLE 2

| Metal element | Atom fraction | At Wt | Product | Wt % |
|---|---|---|---|---|
| Ba | 0.9575 | 137.327 | 131.49060 | 98.52855 |
| Ca | 0.0400 | 40.078 | 1.60312 | 1.20125 |
| Nd | 0.0025 | 144.240 | 0.36060 | 0.27020 |
| Total | 1.0000 | | | 100.00000 |
| Ti | 0.8150 | 47.867 | 39.01161 | 69.92390 |
| Zr | 0.1800 | 91.224 | 16.42032 | 29.43157 |
| Mn | 0.0025 | 54.93085 | 0.13733 | 0.24614 |
| Y | 0.0025 | 88.90585 | 0.22226 | 0.39839 |
| Total | 1.0000 | | | 100.00000 |

A separate solution of ammonium oxalate, somewhat in excess of the amount required, is made in deionized water and heated to 85°-90° C.

The two solutions are mixed by pumping the heated ingredient streams simultaneously through a coaxial fluid jet mixer. A slurry of the co-precipitated powder is produced and filtered, optionally deionized-water washed, and dried. Alternatively, the powder can be collected by centrifugal sedimentation, or some other technique. The subsequent powder is calcined under suitable conditions, e.g., at 1050° C. in air in an appropriate silica glass (fused quartz) tray or tube.

Figure 1:
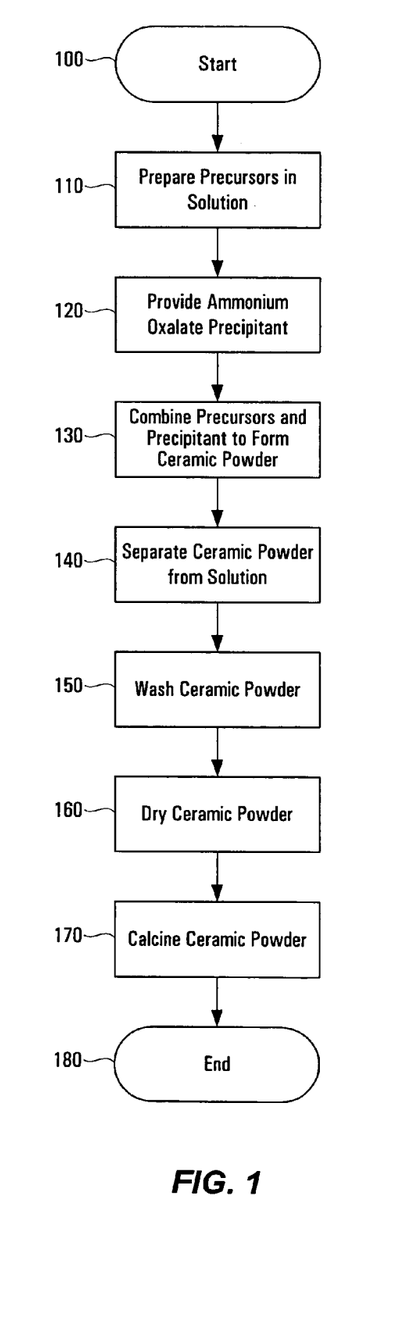
FIG. 1 is a flow chart illustrating ceramic powder processing techniques in accordance with the present invention.

FIG. 1 is a flow chart illustrating ceramic powder processing techniques in accordance with the present invention. The process begins at 100. In operation 110, the appropriate precursor materials, e.g., chelates and other precursors, are provided in solution (110). Next the ammonium oxalate precipitant is provided (120). The two materials are then combined to form the desired ceramic powder via a co-precipitation reaction (130). Once the ceramic powder is formed, it can be separated from the solution in which it is formed (140) using suitable separation devices and techniques. Other post-processing steps can be employed including: washing the ceramic powder (150), drying the ceramic powder (160), and calcining the ceramic powder (170). The process terminates at 180. The resulting ceramic powder can then be used in the fabrication of numerous different devices.

In other examples, multiple chelate precursors are used in a similar process. In the case of zirconium, various Zr compounds can be used as precursors. A convenient zirconium precursor is the hydrolytically stable chelate: zirconium(IV) bis(ammonium 2-hydroxypropanato)dihydroxide [also known as zirconium(IV) bis(ammonium lactato)dihydroxide]$\{[CH_3CH(O-)COONH_4]_2Zr(OH)_2\}$ aqueous solution, which is stable over the pH range from 6 to 8 up to 100° C. Although this compound is not readily available commercially, it can be prepared from any of the alkyl oxides of zirconium(IV). Any of these zirconium(IV) alkyl oxides serve as an intermediate from the zirconium tetrachloride [zirconium(IV) chloride] $(ZrCl_4)$ source in the preparation of all other zirconium(IV) compounds. Examples of commercially available zirconium(IV) alkyl oxides include: the ethoxide $[Zr(OCH_2CH_3)_4]$, the propoxide $[Zr(OCH_2CH_2CH_3)_4]$, the isopropoxide $\{Zr[OCH(CH_3)_2]_4\}$, the butoxide $[Zr(OCH_2CH_2CH_2CH_3)_4]$, and the tert-butoxide $\{Zr[OC(CH_3)_3]_4\}$.

Of these examples, zirconium(IV) isopropoxide (tetra-2-propyl zirconate) is likely to be the lowest cost because of the very large volume of 2-propanol (isopropyl alcohol) produced by several manufacturers. These alkyl oxides are all soluble in alcohols, but they all hydrolyze in the presence of moisture. However, by reaction with 2-hydroxypropanoic acid (2-hydroxypropionic acid, lactic acid) $[CH_3CH(OH)COOH]$, 85 wt % in aqueous solution, followed with ammonium hydroxide $(NH_4OH)$, 28 wt % ammonia $(NH_3)$ in water, the water-stable zirconium(IV) chelate is prepared. The other reaction product is the alcohol from which the zirconium(IV) alkyl oxide was originally made in the reaction with the zirconium tetrachloride source. This alcohol is recoverable by fractional distillation, membrane pervaporization, or the like. This chelate can also be prepared from an aqueous solution of oxozirconium(IV) nitrate (zirconyl nitrate) $[ZrO(NO_3)_2]$ by reaction with 2-hydroxypropanoic acid followed with ammonium hydroxide as described above, resulting in a solution of this chelate and ammonium nitrate.

The suitable hydrolytically stable titanium(IV) chelate: titanium(IV) bis(ammonium 2-hydroxypropanato)dihydroxide [titanium(IV) bis(ammonium lactato)dihydroxide]$\{[CH_3CH(O-)COONH_4]_2Ti(OH)_2\}$, is commercially available from, for example, DuPont with trade name Tyzor® LA. It can be prepared from any of the alkyl oxides of titanium (IV). Readily available commercial titanium(IV) alkyl oxides include the following: the methoxide $[Ti(OCH_3)_4]$, the ethoxide $[Ti(OCH_2CH_3)_4]$, the propoxide $[Ti(OCH_2CH_2CH_3)_4]$, the isopropoxide $\{Ti[OCH(CH_3)_2]_4\}$, the butoxide $[Ti(OCH_2CH_2CH_2CH_3)_4]$, and the tert-butoxide $\{Ti[OC(CH_3)_3]_4\}$. Of these, titanium(IV) isopropoxide (tetra-2-propyl titanate) is likely to be the least expensive. By similar preparation methods as those described above for the conversion of an alkyl oxide of zirconium(IV) to the water-stable chelate, an alkyl oxide of titanium(IV) can be converted to the water-stable titanium(IV) chelate.

Water-soluble and/or stable chelates of manganese(II), yttrium(III), lanthanum(III), neodymium(III), and several other metal ions can be prepared with the use of 2-hydroxypropanoic acid (lactic acid) and ammonium hydroxide. The most convenient starting compounds are commercially available water-insoluble carbonates of these metal ions, because they more readily react with 2-hydroxypropanoic acid aqueous solution to form the very stable water-soluble (ammonium 2-hydroxypropanato)metal-ion chelates. Water-insoluble oxides can also be used as starting compounds, although they are not as quickly reactive.

For example, a manganese chelate can be produced when the manganese(II) carbonate ($MnCO_3$) is converted to bis(ammonium 2-hydroxypropanato)manganese(II) (i.e., ammonium manganese(II) 2-hydroxypropanate) $\{Mn[CH_3CH(O\!-\!)COONH_4]_2\}$, as shown in the following reaction equations:

$$MnCO_3 + 2CH_3CH(OH)COOH \xrightarrow{H_2O} Mn[CH_3CH(OH)COO]_2 + H_2O + CO_2(g);$$

$$Mn[CH_3CH(OH)COO]_2 + 2NH_4OH \xrightarrow{H_2O} Mn[CH_3CH(O\!-\!)COONH_4]_2 + 2H_2O;$$

$$Mn[CH_3CH(O\!-\!)COONH_4]_2 \xrightarrow{H_2O} Mn[CH_3CH(O\text{-})COO]_2^- + 2(NH_4)^+.$$

Similarly, an yttrium chelate can be produced by converting yttrium(III) carbonate $[Y_2(CO_3)_3]$ to tris(ammonium 2-hydroxypropanato)yttrium(III) (i.e., ammonium yttrium (III) 2-hydroxypropanate) $\{Y[CH_3CH(O\!-\!)COONH_4]_3\}$ as shown in the following reaction equations:

$$Y_2(CO_3)_3 + 6CH_3CH(OH)COOH \xrightarrow{H_2O} 2Y[CH_3CH(OH)COO]_3 + 3H_2O + 3CO_2(g);$$

$$Y[CH_3CH(OH)COO]_3 + 3NH_4OH \xrightarrow{H_2O} Y[CH_3CH(O\!-\!)COONH_4]_3 + 3H_2O;$$

$$Y[CH_3CH(O\!-\!)COONH_4]_3 \xrightarrow{H_2O} Y[CH_3CH(O\!-\!)COO]_3^- + 3(NH_4)^+.$$

A lanthanum chelate can be produced by converting lanthanum(III) carbonate $[La_2(CO_3)_3]$ to tris(ammonium 2-hydroxypropanato)lanthunm(III) (i.e., ammonium lanthanum(III) 2-hydroxypropanate) $\{La[CH_3CH(O\!-\!)COONH_4]_3\}$ as shown in the following reaction equations:

$$La_2(CO_3)_3 + 6CH_3CH(OH)COOH \xrightarrow{H_2O} 2La[CH_3CH(OH)COO]_3 + 3H_2O + 3CO_2(g);$$

$$La[CH_3CH(OH)COO]_3 + 3NH_4OH \xrightarrow{H_2O} La[CH_3CH(O\!-\!)COONH_4]_3 + 3H_2O;$$

$$La[CH_3CH(O\!-\!)COONH_4]_3 \xrightarrow{H_2O} La[CH_3CH(O\text{-})COO]_3^- + 3(NH_4)^+.$$

A neodymium chelate can be produced by converting neodymium(III) carbonate $[Nd_2(CO_3)_3]$ to tris(ammonium 2-hydroxypropanato)neodymium(III) (i.e., ammonium neodymium(III) 2-hydroxypropanate) $\{Nd[CH_3CH(O\!-\!)COONH_4]_3\}$ as shown in the following reaction equations:

$$Nd_2(CO_3)_3 + 6CH_3CH(OH)COOH \xrightarrow{H_2O} 2Nd[CH_3CH(OH)COO]_3 + 3H_2O + 3CO_2(g);$$

$$Nd[CH_3CH(OH)COO]_3 + 3NH_4OH \xrightarrow{H_2O} Nd[CH_3CH(O\!-\!)COONH_4]_3 + 3H_2O;$$

$$Nd[CH_3CH(O\!-\!)COONH_4]_3 \xrightarrow{H_2O} Nd[CH_3CH(O\text{-})COO]_3^- + 3(NH_4)^+.$$

In general, nitrate compounds have the highest solubilities in water, as concentration in moles per liter of solution at 20° C., i.e., molar, and moles per 1000 grams of water, i.e., molal, of any salt. Uniquely, there are no water-insoluble nitrates. Since the nitrate anion $[(NO_3)^-]$ does not interfere with the formation of the chelate, the nitrates, too, can be used as starting compounds. The nitrates are readily available commercially. Accordingly the first reaction of 2-hydroxypropanoic acid with the oxo-metal-ion and metal-ion species as indicated above are as follows:

$$(ZrO)^{+2} + 2CH_3CH(OH)COOH \xrightarrow{(NO_3)^-/H_2O} [(CH_3CH(OH)COO]_2ZrO + 2H^+$$

Then with ammonium hydroxide the reaction is:

$$[(CH_3CH(OH)COO]_2ZrO + 2NH_4OH \xrightarrow{H_2O} [CH_3CH(O\!-\!)COONH_4]_2Zr(OH)_2 + H_2O$$

$$Mn^{+2} + 2CH_3CH(OH)COOH \xrightarrow{(NO_3)^-/H_2O} Mn[CH_3CH(OH)COO]_2 + 2H^+$$

$$Y^{+3} + 3CH_3CH(OH)COOH \xrightarrow{(NO_3)^-/H_2O} Y[CH_3CH(OH)COO]_3 + 3H^+$$

$$La^{+3} + 3CH_3CH(OH)COOH \xrightarrow{(NO_3)^-/H_2O} La[CH_3CH(OH)COO]_3 + 3H^+$$

$$Nd^{+3} + 3CH_3CH(OH)COOH \xrightarrow{(NO_3)^-/H_2O} Nd[CH_3CH(OH)COO]_3 + 3H^+$$

The next-step reactions with ammonium hydroxide are the same as those given above.

In the preparation of the hydrolytically stable chelates, at the first step of the reaction of either (1) the titanium(IV) and zirconium(IV) alkyl oxides, or (2) the metal-ion(II) and metal-ion(III) carbonates or nitrates or of the oxozirconium (IV) nitrate with the 2-hydroxypropanoic acid aqueous solution, the more acidic hydrogen ion of the carboxyl group (COOH) splits off first to form (1) the alcohol from which the alkyl oxide was made, or (2) water and carbon dioxide for the carbonates, and hydrogen ions for the nitrates. With addition of the weak base ammonium hydroxide, the hydrogen atom of the hydroxyl group (OH) splits off as a hydrogen ion to form water and the ammonium ion $[(NH_4)^+]$ salt of the 2-hydroxypropanate chelate. The hydrogen atom of the hydroxyl group (OH) on the carbon atom (the 2-position or alpha-position) adjacent to the carbonyl group (C=O) is relatively acidic forming a hydrogen ion splitting off with sufficiently basic conditions provided by the addition of the ammonium hydroxide aqueous solution. Additionally, the presence of the hydroxyl group in the 2-position to the carboxylic acid group results in an increased acidity of the latter.

Figure 2:
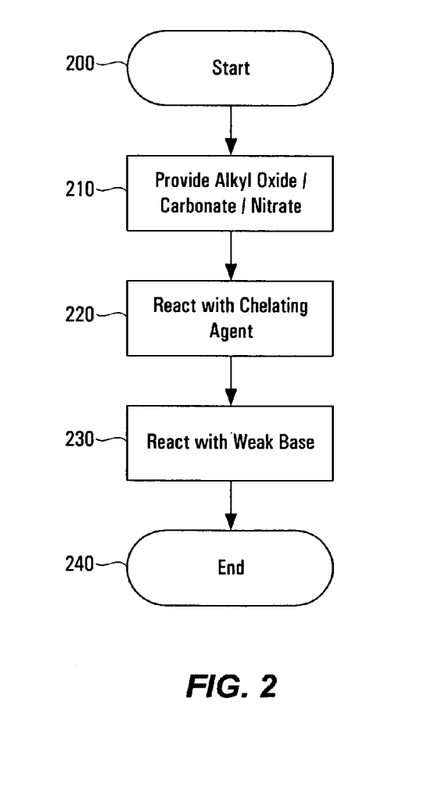
FIG. 2 is a flow chart illustrating chelate processing techniques in accordance with the present invention.

FIG. 2 is a flow chart illustrating chelate processing techniques in accordance with the present invention. The process begins at 200. In operation 210, the appropriate starting material, e.g., a metal alkyl oxide or a metal-ion carbonate or nitrate is selected. The material is selected based on the metal ion it will ultimately provide to a resulting ceramic powder. Next, the starting material is reacted with an appropriate chelating agent (220). For example, the chelating agent can be provided in aqueous solution and combined with the starting material in a suitable reaction vessel. The combined solution is also reacted with a suitable weak base (230) to complete aspects of the reaction. The process terminates at 240.

As a chelating agent, 2-hydroxypropanoic acid is a bidentate ligand, since it can bond to a central metal cation via both oxygen atoms of the five-sided ring. Since the outer cage has two or three anion groups, the total negative charge exceeds the positive charge of the central metal cation, and the chelate is an anion with the ammonium cations $[(NH_4)^+]$ for charge balance. Ammonium ion salts have high water solubilities at neutral and near-neutral pH conditions.

Use of hydrolytically stable chelates in this regard is extremely versatile, even though many of the chelate precursors are not readily available commercially. In particular, such chelates have applicability to all the metal ions of the Periodic Table except, those of Groups IA and perhaps IIA, for co-precipitation procedures in the preparation of ceramic powders. Alkali metal ions do not form complexes and alkaline earth metal ions (Group IIA) form rather weak complexes with 2-hydroxypropanoic acid.

In general all the water-soluble 2-hydroxycarboxylic acids (alpha-hydroxycarboxylic acids) form considerably stronger complex molecular ions with most metals ions, through bidentate chelation involving both functional donor groups, than do the corresponding simple carboxylic acids. This feature makes possible in aqueous solution at neutral and near-neutral pH hydrolytically stable mixtures of these chelates involving two to nearly all metal ions and oxometal ions in any mole ratio of any one to any other. Moreover, it is important to note that the ammonium compounds: nitrates, 2-hydroxypropanates, etc., thermally decompose and oxidize away as gases, so that they do not have to be washed away from the product precipitate. Numerous variations on these chelate formation techniques will be known to those skilled in the art.

Table 3 illustrates an example composition-modified barium titanate compound formed using the above-described chelate precursors. In this example, the formula weight of the resulting compound is 237.24.

TABLE 3

| Precursor | FW | Mol Frac. | Product | Wt % |
|---|---|---|---|---|
| $Ba(NO_3)_2$ | 261.34 | 0.47875 | 125.116525 | 44.450 |
| $Ca(NO_3)_2 \cdot 4H_2O$ | 236.15 | 0.02000 | 4.723 | 1.67 |
| $Nd[CH_3CH(O\text{---})COONH_4]_3$ | 465.57 | 0.00125 | 0.5819625 | 0.207 |
| $[CH_3CH(O\text{---})COONH_4]_2Ti(OH)_2$ | 294.08 | 0.40750 | 119.8376 | 42.575 |
| $[CH_3CH(O\text{---})COONH_4]_2Zr(OH)_2$ | 337.44 | 0.09000 | 30.36964375 | 10.789 |
| $Mn[CH_3CH(O\text{---})COONH_4]_2$ | 269.15 | 0.00125 | 0.3364375 | 0.119 |
| $Y[CH_3CH(O\text{---})COONH_4]_3$ | 410.23 | 0.00125 | 0.5127875 | 0.182 |
| Total | | | 281.4779125 | 100.00 |

In one embodiment, the two ingredient streams, one containing the aqueous solution of all the metal-ion compound precursors and the other containing the aqueous solution of the ammonium oxalate, are reacted together simultaneously and continuously in a fluid jet column that provides a high turbulence energy environment. The ingredient streams can be heated, for example, to 85° C. The total volume for the saturated or near-saturated commercially available and specially manufactured aqueous solutions of the precursors is typically larger than that of the ammonium oxalate in aqueous solution. There are generally two options in this case for the jet fluid column: (1) adjust the former to a flow rate proportionally larger than that of the latter, keeping the stream velocities equal by having the applied driving pressure to the two streams the same, but with the cross-sectional area of the nozzle of the former proportionally larger than that of the latter; and (2) dilute one volume of the latter by a proportional volume of DI water, thereby lowering the concentration of the precipitant. With equal volumes for both streams, the nozzles are alike, the flow rates are equal, and the applied driving pressure is the same. The amount of liquid processed is generally greater than that of the first option, however. The first has the substantial advantage of minimizing the amount of liquid handling and the usage of DI water. Examples of such fluid jet column mixing techniques are described in U.S. Pat. No. 5,087,437 (hereby incorporated by reference herein in its entirety).

In other embodiments, other techniques and devices can be used to combine the ingredient streams such as, for example: (1) pouring one solution in one vessel into the other solution in another vessel and using mechanical or ultrasonic mixing, and (2) metering the solution in one vessel at some given flow rate into the other solution in another vessel and using mechanical or ultrasonic mixing. Numerous other mixing techniques will be known to those skilled in the art.

In co-precipitation procedures from aqueous solution where a strong base hydroxide is used as the precipitant, gelatinous amorphous hydrated hydroxides result. These precipitates can be difficult to filter, e.g., clogging filter cartridges, but also require a lengthy reflux time in the mother liquid, typically at 93° C. at atmospheric pressure for 8 to 12 hours, to densify and transform into the crystalline state. This is desirable to ease filtration and to obtain a useful product. Although the reflux time can be significantly shortened by use of a high-pressure vessel with steam pressure in the range of 100 atmospheres at 300° C., the vessel, associated valves, actuators, heater, and sensors are complicated and costly.

These issues pertaining to the use of a strong base hydroxide as the precipitant can be circumvented by the choice of ammonium oxalate, forming an essentially neutral or near-neutral pH aqueous solution, as the precipitant. As a precipitant, ammonium oxalate has the same advantage as any tetraalkylammonium hydroxide in being thermally decomposed and oxidized away by conversion to gaseous products during the calcination-in-air step of the product powder. However, unlike hydrated hydroxide precipitates, oxalate precipitates are crystalline when formed at, for example, 85° C. in aqueous solution at atmospheric pressure, are readily filterable, are easily and quickly dried in an oven at, for example, 85° C., and are then converted to the desired oxide (or mixed oxide) end product by calcination in air in a furnace silica glass (fused quartz) tube from ambient to approximately 1050° C. These temperatures are examples, and similar results can be achieved with somewhat lower temperatures. To avoid any decomposition of the ammonium oxalate for the formation of the oxalate co-precipitate and the subsequent oven drying thereof, the 90° C. temperature should not be exceeded. A comfortable safety margin is provided at 85° C.

When the co-precipitation reaction is performed, with the use of the above-described ammonium oxalate solution as the precipitant, the powder particle size distribution range is reduced by a factor of four or more over that of previous efforts, and the powder is free flowing. The free-flowing powder characteristics are observed by motion of the powder in a transparent plastic or glass container.

Thus, the resulting slurry is transferred from the mixing vessel to a filtration or separation device. The separating of the precipitate from the liquid phase and the isolation of precipitate can be carried out using a variety of devices and techniques including: conventional filtering, vacuum filtering, centrifugal separation, sedimentation, spray drying, freeze drying, or the like. The filtered powder can then undergo various washing, drying, and calcining steps as desired.

The advantages of wet-chemical methods in the preparation of powders for fabricating oxide ceramics of technical significance are enlarged in scope with the use, as precursors, of hydrolytically stable chelates of metal ions or oxometal ions at neutral and near-neutral pH, and with the use, as the precipitating agent, of ammonium oxalate aqueous solution which is at neutral or near-neutral pH. A preferred chelating agent is the very water-soluble 2-hydroxypropanoic acid (i.e., lactic acid) followed by neutralization with the weak-base ammonium hydroxide aqueous solution, both of which are produced in high volume and are thus relatively low in cost.

In the examples illustrated above, various compounds, solutions, temperature ranges, pH ranges, quantities, weights, and the like are provided for illustration purposes. Those having skill in the art will recognize that some or all of those parameters can be adjusted as desired or necessary. For example, other acids can be used in place of 2-hydroxypropanoic acid as a chelating agent. Alpha-hydroxycarboxylic acids, also known as 2-hydroxycarboxlic acids, having at least the same five-sided ring including the carbonyl group and having the two oxygen atoms of the ring bonding to the central metal ion or oxometal ion can be used and include:

2-hydroxyethanoic acid (i.e., glycolic acid, hydroxyacetic acid) [(OH)CH$_2$COOH];

2-hydroxybutanedioic acid (i.e., malic acid, hydroxysuccinic acid) [HOOCCH$_2$CH(OH)COOH];

2,3-dihydroxybutanedioic acid (i.e., tartaric acid) [HOOCCH(OH)CH(OH)COOH];

2-hydroxy-1,2,3-propanetricarboxylic acid (i.e., citric acid) [(OH)C(COOH)(CH$_2$COOH)$_2$];

2-hydroxybutanoic acid [CH$_3$CH$_2$CH(OH)COOH];

2-hydroxypentanoic acid [CH$_3$(CH$_2$)$_2$CH(OH)COOH]; and 2-hydroxyhexanoic acid (i.e., 2-hydroxycaproic acid) [CH$_3$(CH$_2$)$_3$CH(OH)COOH].

These water-soluble chelating agents are also useful in preparing the water-soluble precursors for the co-precipitation procedure, but they are more costly than lactic acid. The first four of these chelating agents have higher solubilities in water, similar to that of 2-hydroxypropanoic acid. Note that with increasing length of the carbon chain (the nonpolar part of the molecule), the water solubility decreases. Other water-soluble alpha-hydroxycarboxylic acids can be used as will be known to those skilled in the art.

Although the present invention has been described with respect to specific embodiments thereof, various changes and modifications may be suggested to one skilled in the art and it is intended that the present invention encompass such changes and modifications as fall within the scope of the appended claims.

What is claimed:

1. A method of forming a ceramic powder, with a formula of $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_zO_3$, where A=Ag or La, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, $0.995 \leq z \leq 1$, and $0 \leq \alpha \leq 0.005$ the method comprising:

providing a plurality of precursor materials in solution, wherein each of the plurality of precursor materials in solution further comprises at least one constituent ionic species of the ceramic powder, a first precursor material of the plurality of precursor materials comprising barium nitrate, a second precursor material of the plurality of precursor materials comprising a titanium chelate, a third precursor material of the plurality of precursor materials being a metal chelate comprising a metal ion or oxometal ion and a chelating agent, the chelating agent being 2-hydroxypropanoic acid or an alpha-hydroxycarboxylic acid selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid;

combining the plurality of precursor materials in solution with an ammonium oxalate precipitant solution to cause co-precipitation of particles of the ceramic powder in a combined solution at a temperature from 85 to 90° C., the particles including barium, titanium, and the metal ion or oxometal ion; and separating the particles of the ceramic powder from the combined solution;

calcining the particles of the ceramic powder to form composition-modified barium titanate having a perovskite structure.

2. The method of claim 1 wherein the metal chelate is a water soluble hydrolytically stable chelate solution.

3. The method of claim 1 wherein the metal ion or oxometal ion of the metal chelate comprises at least one of Nd, Zr, Mn, La, Y, Pr, Sm, Gd, Dy, Er, Ho, Yb, Ga, Ag, Dy, Er, Ho, Nb, or Mo.

4. The method of claim 1 wherein the metal chelate comprises at least one of zirconium(IV) bis(ammonium 2-hydroxypropanato)dihydroxide;
bis(ammonium 2-hydroxypropanato)manganese(II);
tris(ammonium 2-hydroxypropanato)yttrium(III);
tris(ammonium 2-hydroxypropanato) lanthanum(III); or
tris(ammonium 2-hydroxypropanato)neodymium(III).

5. The method of claim 1 wherein the plurality of precursor materials in solution further comprises a second metal chelate in solution.

6. The method of claim 1 further comprising:
preparing the metal chelate using the chelating agent.

7. The method of claim 6 further comprising:
reacting a metal alkyl oxide with the chelating agent and an ammonium hydroxide solution.

8. The method of claim 6 further comprising:
reacting at least one of a metal-ion carbonate, a metal-ion nitrate, and an oxozirconium(IV)-ion nitrate with the chelating agent and an ammonium hydroxide solution.

9. The method of claim 1 wherein the ceramic powder is a composition-modified barium titanate powder.

10. The method of claim 1 wherein the plurality of precursor materials in solution further comprises $Ca(NO_3)_2 \cdot 4H_2O$.

11. The method of claim 1 wherein the combining further comprises:
mixing the plurality of precursor materials in solution and the ammonium oxalate precipitant solution in a fluid jet column.

12. The method of claim 11 further comprising:
introducing the plurality of precursor materials in solution in a first stream; and
introducing the ammonium oxalate precipitant solution in a second stream.

13. The method of claim 1 wherein the combining further comprises at least one of
mechanically mixing the plurality of precursor materials in solution and the ammonium oxalate precipitant solution; or
ultrasonically mixing the plurality of precursor materials in solution and the ammonium oxalate precipitant solution.

14. The method of claim 1 wherein the separating the ceramic powder from the combined solution further comprises at least one of
filtering the ceramic powder from the combined solution;
centrifuging the combined solution;
sedimenting the combined solution;
spray drying the combined solution; or
freeze drying the combined solution.

15. The method of claim 1 further comprising at least one of
washing the separated ceramic powder;
drying the separated ceramic powder;
calcining the separated ceramic powder; or
sintering the separated ceramic powder.

16. The method of claim 1 wherein the plurality of precursor materials in solution further comprises $Ca(NO_3)_2 \cdot 4H_2O$.

17. The method of claim 1, wherein barium comprises 0.975 to 1.0 mole fraction of A sites of the perovskite structure.

18. A method for forming a ceramic powder, with a formula of $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_z O_3$, where A=Ag or La, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, $0.995 \leq z \leq 1$, and $0 \leq \alpha \leq 0.005$ the method comprising:

providing a plurality of precursor materials in solution, wherein each of the plurality of precursor materials in solution further comprises at least one constituent ionic species of the ceramic powder, a first precursor material of the plurality of precursor materials comprising barium nitrate; a second precursor material of the plurality of precursor materials comprising a titanium chelate, a third precursor material of the plurality of precursor materials being a metal chelate comprising a metal ion or oxometal ion and a chelating agent, the chelating agent being 2-hydroxypropanoic acid or an alpha-hydroxycarboxylic acid selected from the group consisting of 2-hydroxyethanoic acid, 2-hydroxybutanedioic acid, 2,3-dihydroxybutanedioic acid, 2-hydroxy-1,2,3-propanetricarboxylic acid, 2-hydroxybutanoic acid, 2-hydroxypentanoic acid, and 2-hydroxyhexanoic acid;

combining the plurality of precursor materials in solution with an ammonium oxalate precipitant solution to cause co-precipitation of particles of the ceramic powder in a combined solution at a temperature from 85 to 90° C.;

separating the particles of the ceramic powder from the combined solution; and calcining the particles of the ceramic powder to form composition-modified barium titanate comprising the barium, the titanium, and the metal ion or oxometal ion and having a perovskite structure.

19. The method of claim 18 wherein the metal ion or oxometal ion of the metal chelate comprises at least one of Nd, Zr, Mn, La, Y, Pr, Sm, Gd, Dy, Er, Ho, Yb, Ga, Ag, Dy, Er, Ho, Nb, or Mo.

20. The method of claim 18 wherein the metal chelate comprises at least one of zirconium(IV) bis(ammonium 2-hydroxypropanato)dihydroxide;

bis(ammonium 2-hydroxypropanato)manganese(II);

tris(ammonium 2-hydroxypropanato)yttrium(III);

tris(ammonium 2-hydroxypropanato)lanthanum(III); or tris(ammonium 2-hydroxypropanato)neodymium(III).

21. The method of claim 18, wherein barium comprises 0.975 to 1.0 mole fraction of A sites of the perovskite structure.

22. A method for forming a ceramic powder, with a formula of $(Ba_{1-\alpha-\mu-\nu}A_\mu D_\nu Ca_\alpha)[Ti_{1-x-\delta-\mu'-\nu'}Mn_\delta A'_{\mu'}D'_{\nu'}Zr_x]_z O_3$, where A=Ag or La, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu' \leq 0.01$, $0 \leq \delta \leq 0.01$, $0.995 \leq z \leq 1$, and $0 \leq \alpha \leq 0.005$ the method comprising:

providing a plurality of precursor materials in solution, wherein each of the plurality of precursor materials in solution further comprises at least one constituent ionic species of the ceramic powder, a first precursor material of the plurality of precursor materials comprising barium nitrate; a second precursor material of the plurality of precursor materials comprising a titanium chelate, a third precursor material of the plurality of precursor materials being a metal chelate comprising a metal ion or oxometal ion and a chelating agent, the chelating agent being 2-hydroxypropanoic acid or an alpha-hydroxycarboxylic acid selected from the group consisting of 2-hydroxyethanoic acid, 2-hydroxybutanedioic acid, 2,3- dihydroxybutanedioic acid, 2-hydroxy-1,2,3-propanetricarboxylic acid, 2-hydroxybutanoic acid, 2-hydroxypentanoic acid, and 2-hydroxyhexanoic acid, the metal ion or oxometal ion of the metal chelate comprising an element selected from the group consisting of Nd, Zr, Mn, La, Y, Pr, Sm, Gd, Dy, Er, Ho, Yb, Ga, Ag, Dy, Er, Ho, Nb, and Mo;

combining the plurality of precursor materials in solution with an ammonium oxalate precipitant solution to cause co-precipitation of particles of the ceramic powder in a combined solution at a temperature from 85 to 90° C., the particles comprising barium, titanium, and the metal ion or oxometal ion;

separating the particles of the ceramic powder from the combined solution; and calcining the particles of the ceramic powder to form composition-modified barium titanate having a perovskite structure.

23. The method of claim 22, wherein barium comprises 0.975 to 1.0 mole fraction of A sites of the perovskite structure.

24. The method of claim 22, wherein the composition-modified barium titanate comprises Ca, Nd, Zr, Mn, and Y.

* * * * *